United States Patent
Knauft et al.

(10) Patent No.: US 10,419,498 B2
(45) Date of Patent: Sep. 17, 2019

(54) EXCLUSIVE SESSION MODE RESILIENT TO FAILURE

(71) Applicant: VMware, Inc., Palo Alto, CA (US)

(72) Inventors: Eric Knauft, San Francisco, CA (US); Luke Lu, San Jose, CA (US); Wenguang Wang, Santa Clara, CA (US); Pascal Renauld, Palo Alto, CA (US); Radu Berinde, Cambridge, MA (US); Ruocheng Li, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 789 days.

(21) Appl. No.: 14/956,284

(22) Filed: Dec. 1, 2015

(65) Prior Publication Data
US 2017/0155691 A1    Jun. 1, 2017

(51) Int. Cl.
*H04L 29/08* (2006.01)
*H04L 29/06* (2006.01)

(52) U.S. Cl.
CPC ...... *H04L 65/1069* (2013.01); *H04L 67/1097* (2013.01)

(58) Field of Classification Search
CPC ............. H04L 65/1069; H04L 67/1097; H04L 65/1066; G06F 21/6218; G06F 3/067; G06F 3/0665; G06F 9/45558; G06F 3/061; G06F 16/2343; G06F 9/526
See application file for complete search history.

(56) References Cited

U.S. PATENT DOCUMENTS

| | | | | |
|---|---|---|---|---|
| 7,484,087 | B2* | 1/2009 | Doddington | G06Q 30/0603 705/35 |
| 2003/0016676 | A1* | 1/2003 | Allen | H04Q 11/0478 370/395.52 |
| 2003/0163697 | A1* | 8/2003 | Pabla | H04L 9/0838 713/171 |
| 2007/0111797 | A1* | 5/2007 | Sasaki | A63F 13/12 463/42 |
| 2007/0140236 | A1* | 6/2007 | Parthasarathy | H04L 67/2814 370/389 |
| 2014/0140507 | A1* | 5/2014 | Park | H04W 8/245 380/247 |
| 2015/0058577 | A1* | 2/2015 | Earl | G06F 3/0613 711/136 |
| 2015/0244813 | A1* | 8/2015 | Tamura | H04L 67/141 709/227 |
| 2015/0288765 | A1* | 10/2015 | Skraparlis | H04L 12/4641 709/228 |
| 2016/0128118 | A1* | 5/2016 | Duffell | H04W 12/04 455/41.2 |

FOREIGN PATENT DOCUMENTS

JP    2006018538 A * 1/2006 ............. H04N 5/765

* cited by examiner

*Primary Examiner* — Oanh Duong

(57) ABSTRACT

Examples perform input/output (I/O) requests, issued by a plurality of clients to an owner-node, in a virtual storage area network (vSAN) environment. I/O requests are guaranteed, as all I/O requests are performed during non-overlapping, exclusive sessions between one client at a time and the owner node. The owner node rejects requests for simultaneous sessions, and duplicate sessions are prevented by requiring that a client refresh its memory state after termination of a previous session.

20 Claims, 9 Drawing Sheets

EXCLUSIVE SESSION MODE RESILIENT TO FAILURE

BACKGROUND

Distributed systems allow multiple clients in a network to access a pool of shared resources. For example, a distributed storage system allows a cluster of host computers to aggregate local disks (e.g., solid-state drive (SSD), peripheral component interconnect-based (PCI) flash storage, or serial AT attachment (SATA) or serial access storage (SAS) magnetic disks) located in or attached to each host computer to create a single and shared pool of storage. This pool of storage (sometimes referred to as a "datastore" or "store") is accessible by all host computers in the cluster and may be presented as a single namespace of storage entities (such as a hierarchical file system namespace in the case of files, a flat namespace of unique identifiers in the case of objects, etc.). Storage clients in turn, such as virtual machines (VMs) spawned on the host computers, may use the datastore, for example, to store virtual disks that are accessed by the virtual machines during their operation.

This approach provides enterprises with cost-effective performance. For instance, distributed storage using pooled local disks is inexpensive, highly scalable, and relatively simple to manage. Because such distributed storage can use commodity disks in the cluster, enterprises do not need to invest in additional storage infrastructure. However, one issue with such a distributed system is how to prevent multiple users, clients, or VMs from attempting to make simultaneous, potentially conflicting, input/output (I/O) requests to the datastore. Existing systems utilize a heavy-duty lock system, only permitting access to the datastore to the user, client, VM, etc. which has the appropriate authority (e.g., the disk is unlocked for editing for that user, while locked to other users). Existing lock systems are, in some examples, too cumbersome and expensive, as they require more time and processing resources due to communication back and forth between the datastore and the users and extra I/O incurred during the lock/unlock operation.

SUMMARY

In some examples, non-overlapping, exclusive client sessions are established between a client with pending I/O requests and a current owner node with the ability to make I/O requests to the underlying storage. A client initiates a client session with the owner node, established by an election protocol. In the course of the client session, the client makes I/O requests to the datastore or underlying storage, via the owner node. The owner node processes the I/O requests until the session is terminated by the client, or until the session is disconnected for reasons such as owner failover, a loss of liveness, node failure, communications failure, etc. (referred to generally as terminated). Upon termination of the client session, the client is flagged as invalid for reconnection, and any outstanding I/O requests or writes are returned to the client with an error code. Subsequently, another client session is initiated by a second client. The first client cannot initiate a subsequent non-overlapping client session until it has refreshed its memory state, thus clearing the flag. In this manner, the system ensures that no I/O requests, other than those from the client, have happened. The operations described herein are, in some examples, performed in a Distributed Object Model (DOM) environment, although they are not limited to a DOM environment.

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Examples described herein enable a plurality of I/O requests, issued from a plurality of virtual machines (VMs), clients, hosts, etc. to be performed without utilizing a heavy-duty locking system (e.g., one in which access is strictly controlled through mutual exclusion, and locks must be released and obtained before any I/O writes are made), and without compromising the integrity of any of the I/O request. In some examples, clients run on all hosts that are running VMs. Although a plurality of all of the clients seek to make simultaneous I/O requests to the virtual storage area network (vSAN) via an owner node which controls access to the vSAN, the owner node establishes sequential, non-overlapping, exclusive sessions with one client at a time, guaranteeing the integrity or validity of the I/O requests of all of the clients.

Accordingly, because a heavy duty locking system is not required, the I/O writes are made more efficiently as sessions are established in quick succession. The disclosed method is resilient to crashes and restores, in contrast to locks which are stateful and persistent. Locks must be "remembered" despite crashes, in contrast to the present method. Further, memory consumption is reduced, because transaction logs are not maintained by individual clients or VMs. This allows clients to open a session with an owner node, and the owner node guarantees anything it reads/writes, regardless of network activity. Further, this allows clients to avoid races where there are in-flight I/O requests, and clients are not aware of other I/O requests from other clients. Additionally, without using heavy duty locks, processing resources are conserved, and network bandwidth usage is reduced because back and forth communication between clients is reduced without the necessity of upgrading and downgrading lock status.

Figure 1:
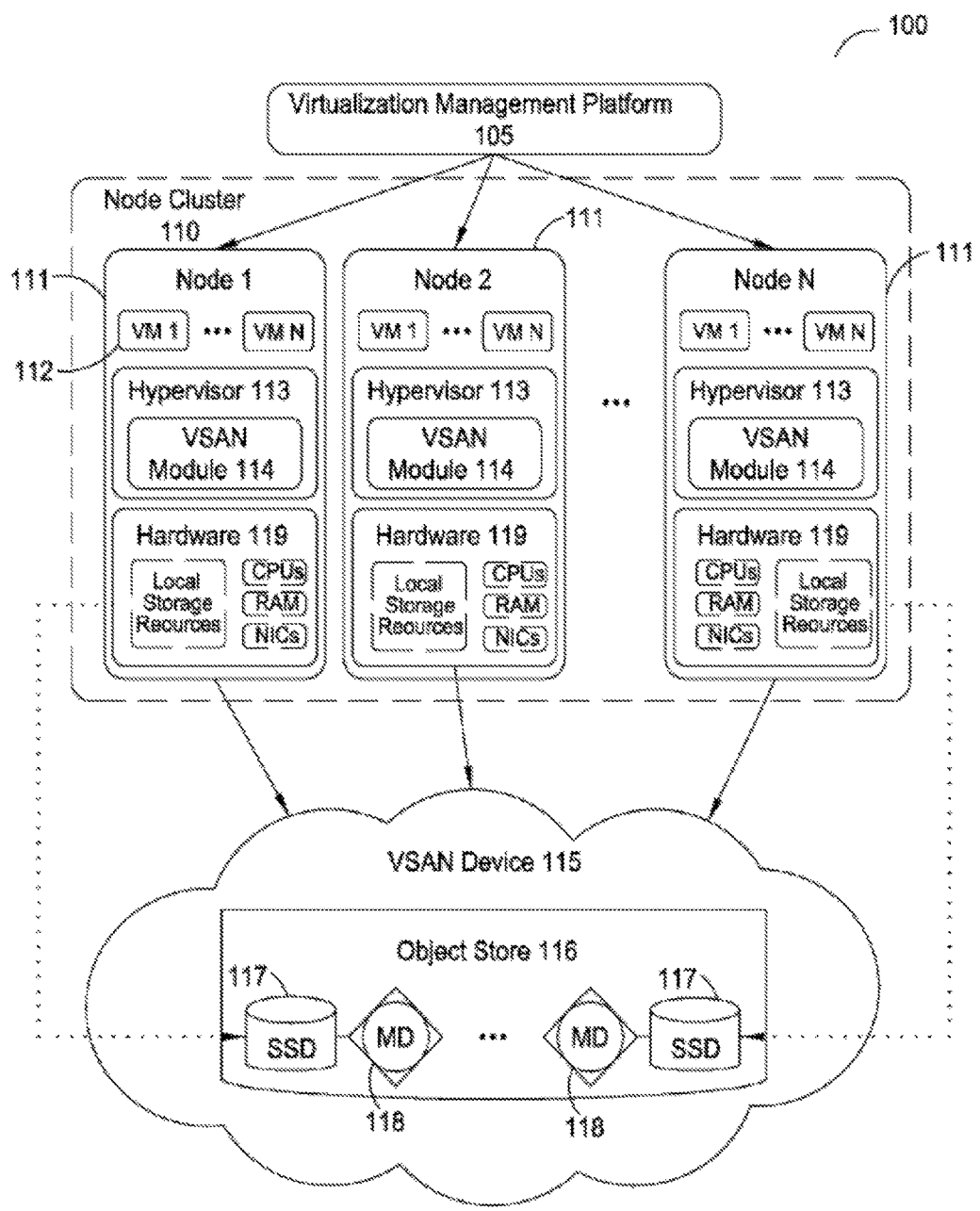
FIG. 1 is a block diagram of an exemplary computing environment for implementing non-overlapping, exclusive session modes.

FIG. 1 illustrates a block diagram of an exemplary computing environment 100. As shown, computing environment 100 is a vSAN environment that leverages the commodity local storage housed in or directly attached (hereinafter, use of the term "housed" or "housed in" may be used to encompass both housed in or otherwise directly attached) to host servers or nodes 111 of a cluster 110 to provide an aggregate object store 116 to VMs 112 running on the nodes 111. The local commodity storage housed in or otherwise directly attached to the nodes 111 may include combinations of solid state drives (SSDs) 117, magnetic or spinning disks 118, or any other storage devices or combination thereof. In certain embodiments, SSDs 117 serve as a read cache and/or write buffer in front of magnetic disks 118 to increase I/O performance.

A virtualization management platform 105 is associated with a plurality or a cluster 110 of nodes 111. Virtualization management platform 105 enables an administrator to manage the configuration and spawning of VMs on the various nodes 111.

As depicted in the embodiment of FIG. 1, each node 111 includes a virtualization layer or hypervisor 113, a vSAN module 114, and hardware platform 119 (which includes the SSDs 117 and magnetic disks 118 of a node 111). Through hypervisor 113, a node 111 is able to launch and run multiple VMs 112.

Hypervisor 113, in part, manages hardware platform 119 to properly allocate computing resources (e.g., processing power, random access memory, etc.) for each VM 112. Furthermore, as described further below, each hypervisor 113, through its corresponding vSAN module 114, provides access to storage resources located in hardware platform 119 (e.g., SSDs 117 and magnetic disks 118) for use as storage for virtual disks (or portions thereof) and other related files that may be accessed by any VM 112 residing in any of nodes 111 in cluster 110. In one example, vSphere Hypervisor from VMware, Inc. (VMware) may be installed on nodes 111 as hypervisor 113 and vCenter Server from VMware may be used as virtualization management platform 105.

In one example, vSAN module 114 is implemented as a "vSAN" device driver within hypervisor 113. In that example, vSAN module 114 provides access to a conceptual "vSAN" 115 through which an administrator can create a number of top-level "device" or namespace objects that are backed by object store 116. In one common scenario, during creation of a device object, the administrator may specify a particular file system for the device object (such device objects hereinafter also thus referred to "file system objects"). For example, each hypervisor 113 in each node 111 discovers, during a boot process, a /vsan/root node for a conceptual global namespace that is exposed by vSAN module 114. By, for example, accessing application program interfaces (APIs) exposed by vSAN module 114, hypervisor 113 can then determine all the top-level file system objects (or other types of top-level device objects) currently residing in vSAN 115.

When a VM (or other client) attempts to access one of the file system objects, hypervisor 113 may dynamically "auto-mount" the file system object at that time. A file system object (e.g., /vsan/fs_name1, etc.) that is accessible through vSAN 115 may, for example, be implemented to emulate the semantics of a particular file system such as VMware's distributed or clustered file system, Virtual Machine File System (VMFS), which is designed to provide concurrency control among simultaneously accessing VMs.

Because vSAN 115 supports multiple file system objects, it is able provide storage resources through object store 116 without being confined by limitations of any particular clustered file system. For example, many clustered file systems (e.g., VMFS, etc.) can only scale to support a certain amount of nodes 111. By providing multiple top-level file system object support, vSAN 115 overcomes the scalability limitations of such clustered file systems.

As described in further detail in the context of FIG. 2 below, a file system object, may, itself, provide access to a number of virtual disk descriptor files (e.g., .vmdk files in a vSphere environment, etc.) accessible by VMs 112 running in cluster 110. These virtual disk descriptor files contain references to virtual disk "objects" that contain the actual data for the virtual disk and are separately backed by object store 116.

A virtual disk object may itself be a hierarchical or "composite" object that, as described further below, is further composed of "component" objects (again separately backed by object store 116) that reflect the storage requirements (e.g., capacity, availability, Input/Output Operations Per Second (IOPs) etc.) of a corresponding storage profile or policy generated by the administrator when initially creating the virtual disk. As further discussed below, each vSAN module 114 (through a cluster level object management or "CLOM" sub-module, in embodiments as further described below) communicates with other vSAN modules 114 of other nodes 111 to create and maintain an in-memory metadata database (e.g., maintained separately but in synchronized fashion in the memory of each node 111) that contains metadata describing the locations, configurations, policies and relationships among the various objects stored in object store 116. This in-memory metadata database is utilized by a vSAN module 114 on a node 111, for example, when an administrator first creates a virtual disk for a VM as well as when the VM is running and performing I/O operations (e.g., read or write) on the virtual disk. As further discussed below in the context of FIG. 3, vSAN module 114 (through a distributed object manager or "DOM" sub-module, in one embodiment as further described below) traverses a hierarchy of objects using the metadata in the in-memory database in order to properly route an I/O operation request to the node (or nodes) that houses (house) the actual physical local storage that backs the portion of the virtual disk that is subject to the I/O operation.

Figure 2:
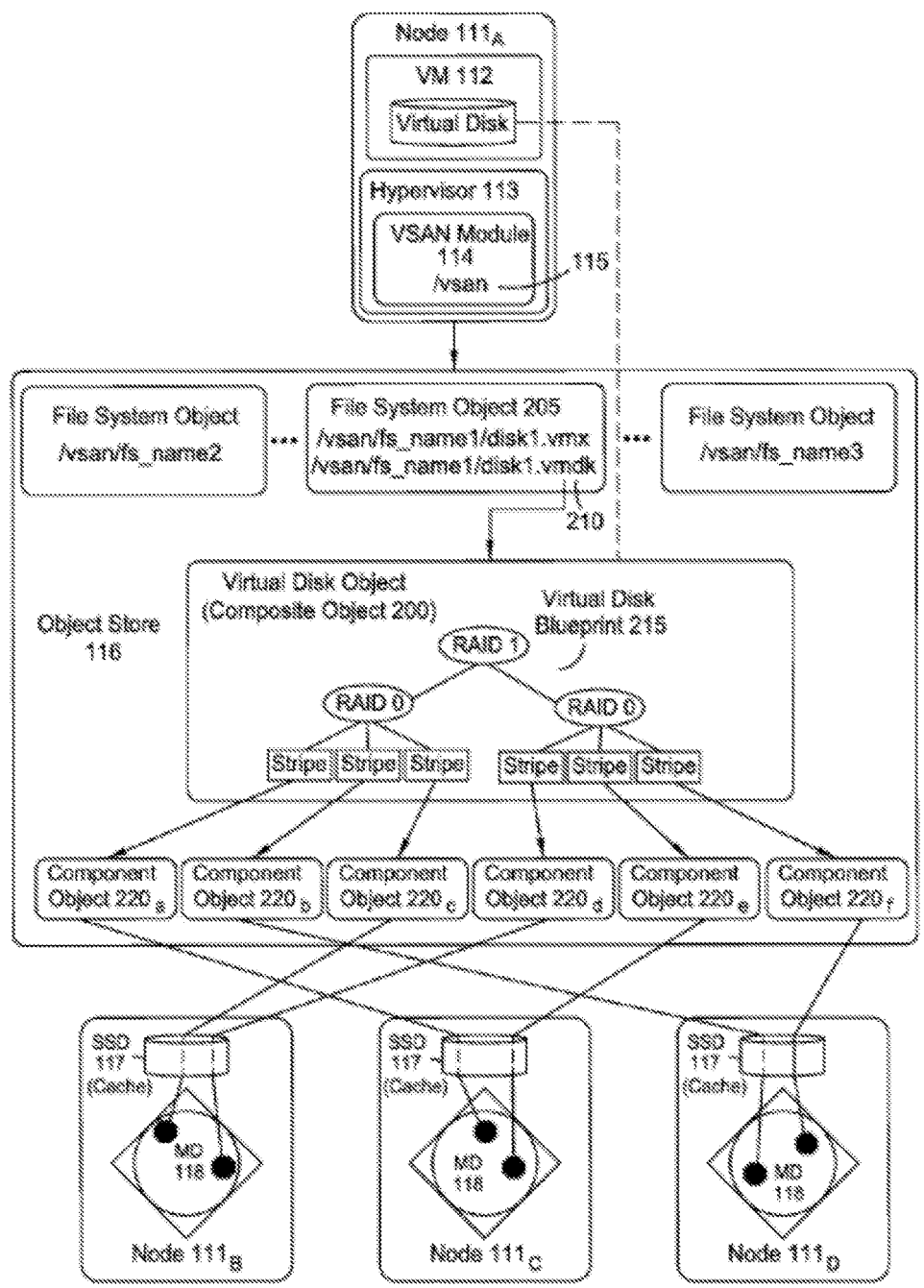
FIG. 2 is an example hierarchical structure of objects organized within object store that represent a virtual disk.

FIG. 2 illustrates an example hierarchical structure of objects organized within object store 116 that represent a virtual disk, according to one embodiment. As previously discussed above, a VM 112 running on one of nodes 111 may perform I/O operations on a virtual disk that is stored as a hierarchical or composite object 200 in object store 116.

Hypervisor 113 provides VM 112 access to the virtual disk by interfacing with the abstraction of vSAN 115 through vSAN module 114 (e.g., by auto-mounting the top-level file system object corresponding to the virtual disk object, as previously discussed, in one embodiment). For example, vSAN module 114, by querying its local copy of the in-memory metadata database, is able to identify a particular file system object 205 (e.g., a VMFS file system object in one embodiment, etc.) stored in vSAN 115 that stores a descriptor file 210 for the virtual disk (e.g., a .vmdk file, etc.). It should be recognized that the file system object 205 may store a variety of other files consistent with its purpose, such as virtual machine configuration files (e.g., .vmx files in a vSphere environment, etc.) and the like when supporting a virtualization environment. In certain embodiments, each file system object may be configured to support only those virtual disks corresponding to a particular VM (e.g., a "per-VM" file system object).

Descriptor file 210 includes a reference to composite object 200 that is separately stored in object store 116 and conceptually represents the virtual disk (and thus may also be sometimes referenced herein as a virtual disk object). Composite object 200 stores metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPs, etc.) generated by an administrator when creating the virtual disk. For example, in the embodiment of FIG. 2, composite object 200 includes a virtual disk blueprint 215 that describes a redundant array of independent disks (RAID) 1 configuration where two mirrored copies of the virtual disk (e.g., mirrors) are each further striped in a RAID 0 configuration. Composite object 225 may thus contain references to a number of "leaf" or "component" objects 220x corresponding to each stripe (e.g., data partition of the virtual disk) in each of the virtual disk mirrors. The metadata accessible by vSAN module 114 in the in-memory metadata database for each component object 220 (e.g., for each stripe) provides a mapping to or otherwise identifies a particular node 111 in cluster 110 that houses the physical storage resources (e.g., magnetic disks 118, etc.) that actually store the stripe (as well as the location of the stripe within such physical resource).

Further, an "owner" node (illustrated in FIG. 3, and described below) of composite object 225 (designated by an election protocol in a directory service of cluster 110) coordinates transactions to corresponding component objects 220x. This is described in detail in FIGS. 4, 5, and 6.

Figure 3:
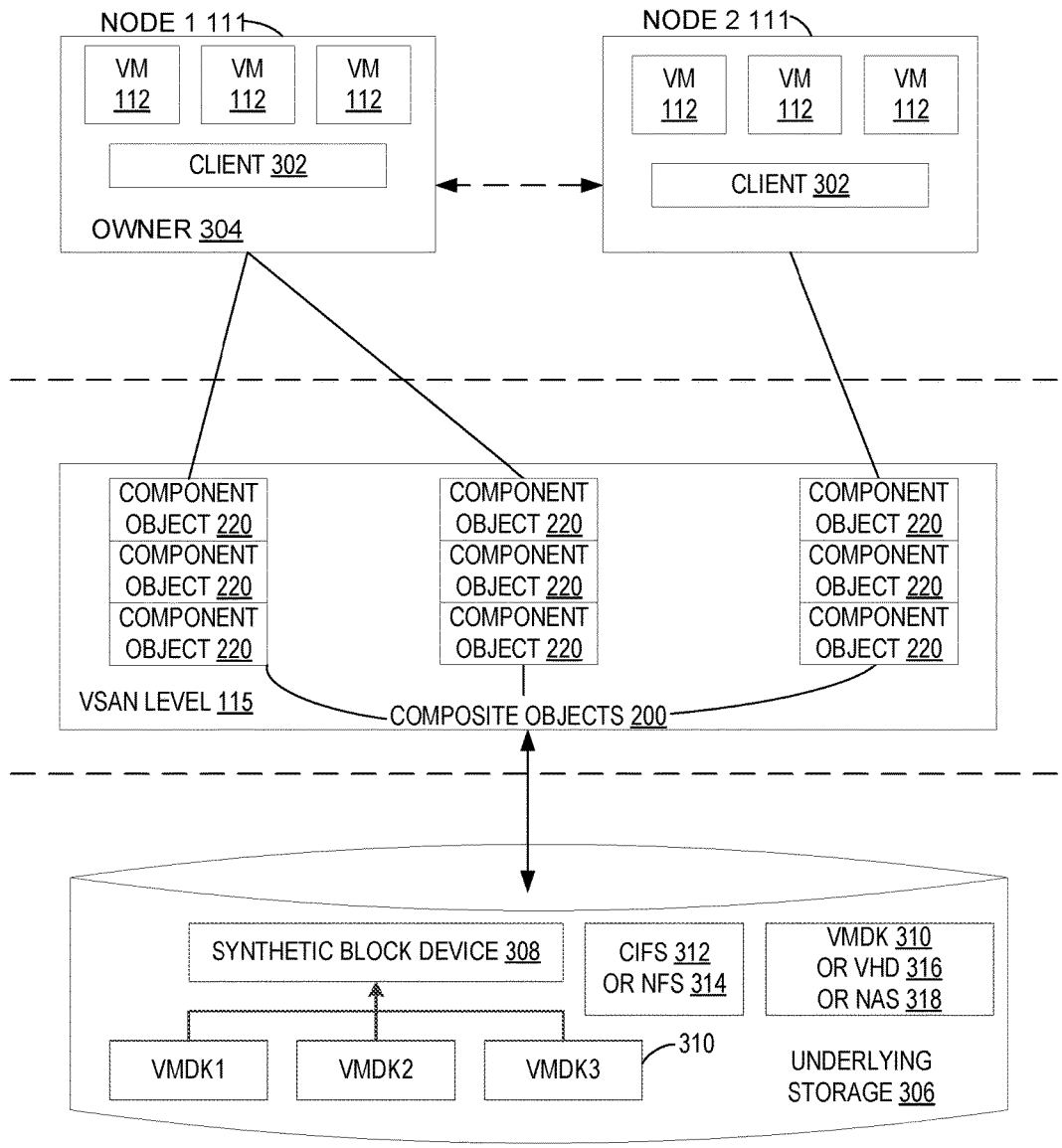
FIG. 3 is a block diagram of an exemplary system, wherein one node has been designated as an owner node for executing non-overlapping, exclusive sessions with multiple clients.

FIG. 3 is a block diagram of an exemplary system, wherein one node 111 has been designated as an "owner node" for executing, managing, or controlling non-overlapping, exclusive sessions with multiple clients. In the example of FIG. 3, the Node 1 111 is designated as the "owner node" 304. Multiple VMs 112 operate on each node 111. Likewise, a client 302 operates on each of the nodes 111. The clients 302 receive I/O requests from the VMs 112 and transmit or issue those requests during sessions with the owner 304. Typically, the VMs 112 communicate their I/O requests or writes to the client 302 operating on the same node 111 as the VM 112. However, in some examples, particularly if a VM 112 was recently migrated, the VM 112 communicates with a client 302 operating on a different node 111.

As previously described, the owner node 304 is designated by an election protocol. In the illustrated example, Node 1 111 is designated as the owner node 304 because it has control over a majority of the plurality of component objects 220, by way of controlling two of the composite objects 200 and their associated component objects 220. The vSAN level is comprised, in part, of the composite objects 200 and their component objects 220, as illustrated in more detail in FIGS. 1 and 2. The vSAN level virtualizes the underlying storage 306. The underlying storage, in some examples as illustrated in FIG. 3, includes a synthetic block device 308. A synthetic block device (SBD) 308 presents a file system whose contents are generated based on a backing repository, but delivered on a just-in-time basis as the operating system (OS) makes queries to underlying disk. Some example SBDs include a virtual machine disk (VMDK) 310, a network file system (NFS) 314, common internet file system (CIFS) 312, virtual hard drive (VHD) 316, or network-attached storage (NAS) 318.

The systems and architectures described in FIGS. 1, 2, and 3, as well as equivalent, undescribed structures, constitute exemplary means for performing the operations described herein. For example, the clients 302, which are in communication with the owner node 304, illustrated in FIG. 3, constitute exemplary means for requesting sessions, and transmitting I/O requests to the owner node 304 during the sessions. Likewise, the owner node 304 illustrated in FIG. 3, and also represented generically as a node 111 in FIGS. 1 and 2, constitutes exemplary means for establishing sessions, such as a first session (established with a first client 302) and second or subsequent sessions (established with a second or subsequent client 302), and performing the I/O request transmitted by the clients 302. The vSAN 115 and its underlying storage 306, illustrated in FIGS. 1, 2, and 3 is the structure upon which the I/O requests are performed, and virtualized for presentation to the other layers.

Figure 4:
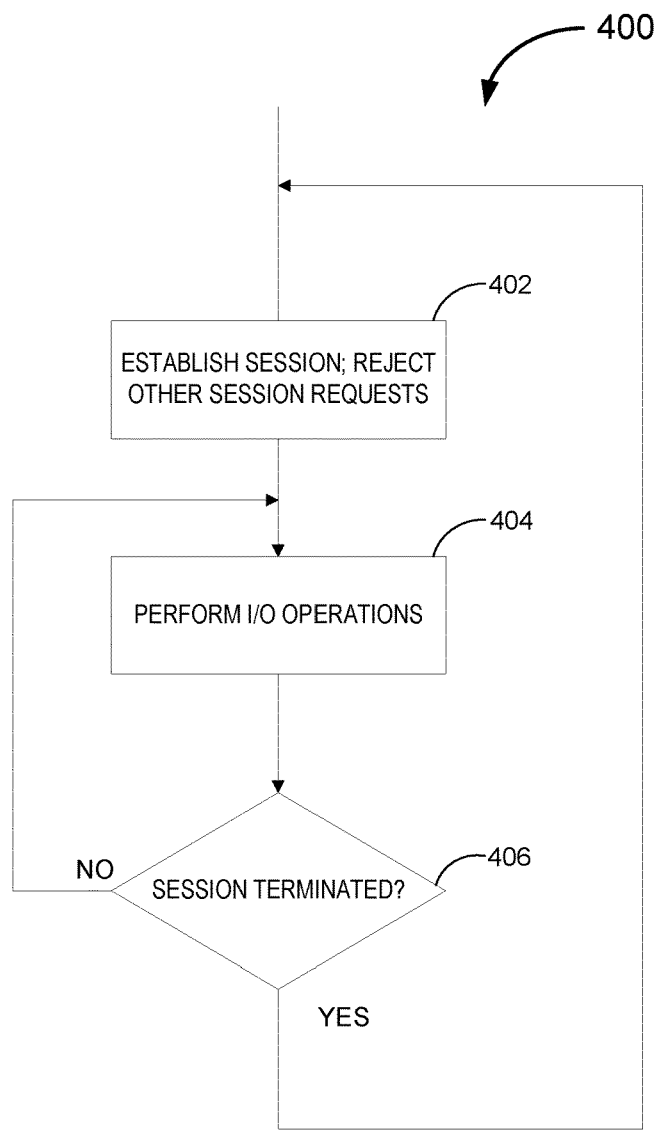
FIG. 4 is a flowchart of an exemplary method of executing non-overlapping, exclusive sessions between multiple clients and a single owner node.

FIG. 4 is a flowchart of an exemplary method of executing non-overlapping, exclusive sessions between multiple clients and a single owner node. Under method 400, the owner node 304 establishes a first session with a client 302 of the plurality of clients 302 at 402 in response to the request for a session from the client 302, referred to herein as the "session client" 302. Establishing the first session with the first or session client 302 includes rejecting requests for sessions from all clients 302 except the session client 302. An object (a tree of composite objects) is considered as a whole, so all requests to any composite objects will be rejected. In other words, individual composite objects (e.g. top-level objects) have completely independent sessions. A given composite object is considered as a unit and a session cannot affect only a subset of the components, which comprise that object.

The session, or client session, established with the session client 302 is exclusive. Alternatively, sessions are described as non-concurrent, non-overlapping, sequential, exclusive, occur singly, unique, etc. Upon establishing the session with the session client 302, the owner node 304 rejects all other session requests from all other clients 302 during the session with the connected session client 302. However, the other clients 302 continue to request sessions until they create valid sessions and complete their I/O operations.

At 404, the owner node 304 performs the I/O operations requested by the session client 302. For the duration of the session, the owner node 304 continues to perform the I/O operations requested by the session client 302. During the session, no other I/O operations are performed by the owner 304. Similarly, because the owner node 304 has control of the underlying composite objects 200 and their component objects 220, no I/O operations are performed by other clients 302. In this manner, the owner node 304 guarantees that no other, potentially conflicting, I/O operations are made while the session client 302 is engaged in its non-overlapping, exclusive session with the owner node 304.

Figure 5:
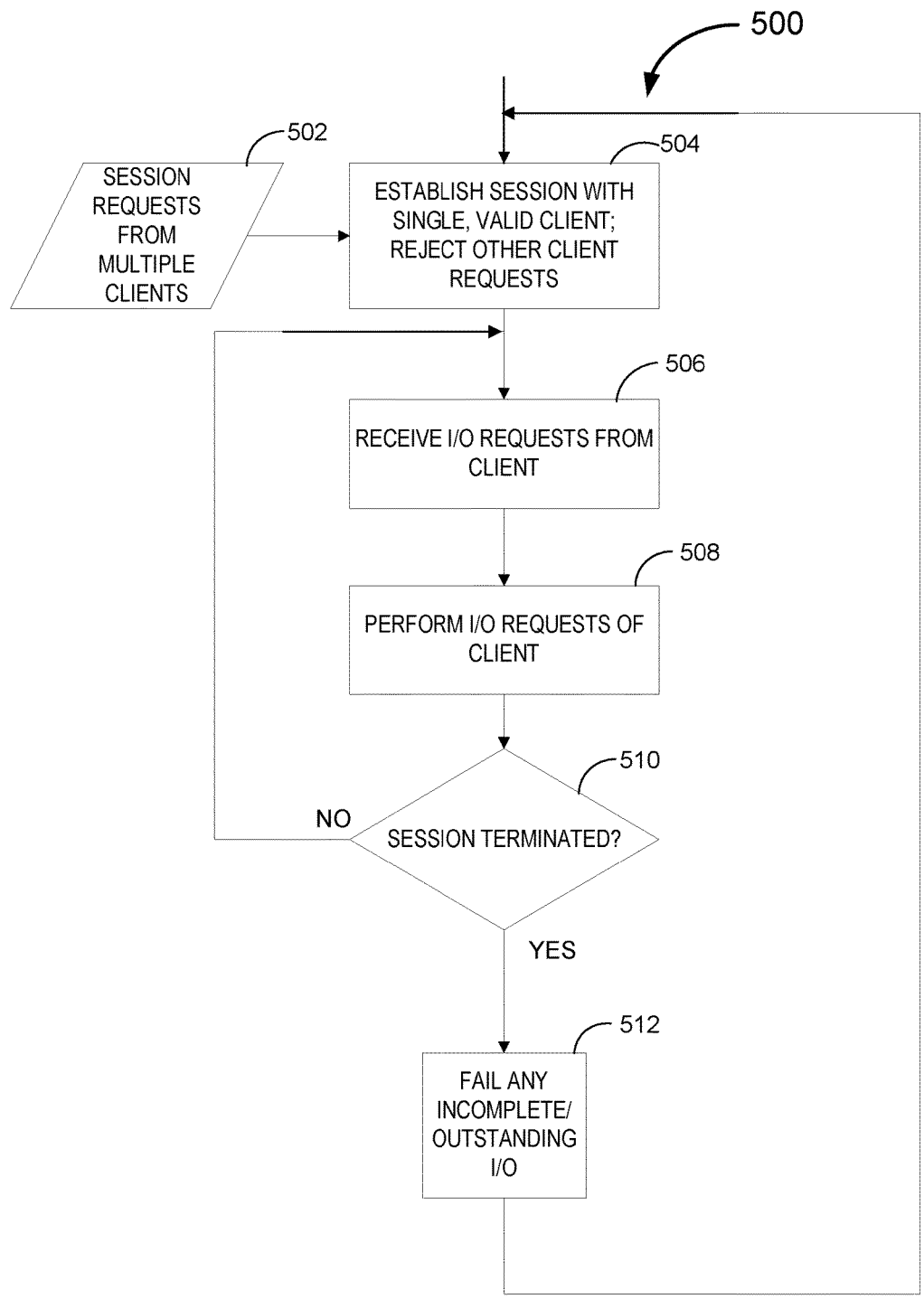
FIG. 5 is a flowchart of an exemplary method of executing non-overlapping, exclusive sessions between multiple clients and a single owner node, as performed by the owner node.

FIG. 5 is a flowchart of an exemplary method of executing non-overlapping, exclusive sessions between multiple clients and a single owner node, as performed by the owner node. Under method 500, the owner node 304 receives session requests from multiple clients at 502. Based on the requests, the owner node 304 accepts the session request from one of the valid clients 302 requesting sessions (e.g. the session client 302) at 504. All other session requests are rejected at 504, ensuring that the session created with the session client 302 is non-overlapping and exclusive. Rejected clients 302 continue to request sessions with the owner node 304 until the session has occurred, or until the I/O requests of that client 302 are withdrawn.

When establishing a non-overlapping, exclusive session, in some examples, no priority is given to one client 302 over another client 302. Rather, when selecting the session client 302, any valid client 302 establishes a session with the owner node 304, and the first valid client 302 to request a session is given priority. In other examples, some clients 302 are given priority over other clients 302. For example, under a policy federated by the administrator, the VMs 112 associated with one client 302 are operating essential applications, operated by essential users, etc. In an alternative example, clients 302 are prioritized based on a selection algorithm or method, such as round-robin. Alternatively, clients 302 are prioritized based on number of pending I/O requests, time requests have been pending, etc.

A client 302 is considered "valid" and able to connect if the client has a refreshed memory state, and is requesting a type of session, which the owner node 304 is able to support. In some examples, the memory state is metadata, a log, etc. Information such as memory state, a flagged or unflagged status (e.g., the flag status), and requested connection type is transmitted as part of the association connection data. The association connection data, in some examples, informs the owner node 304 that it should refuse to establish a session with the client 302, until the client 302 has resolved issues such as stale memory state, or requesting an inappropriate connection type.

As an example, valid clients 302 are identified by data passed as part of the association connection data transmitted through a network abstraction layer, such as Reliable Datagram Transport (RDT) by VMware, Inc. In that example, a flag or other internal object state is specified at open time (e.g., devfs mkdev, or other device or special file permitting interaction with a device driver by software) and transmitted, from each client 302 attempting to connect, to the owner node 304. In another example, the flag is passed to vSAN. The flag is passed to the client 302, and kept in memory on both the client 302 and owner node 304. The flag indicates whether the memory state of the client 302 is stale, up-to-date, refreshed, needs to be refreshed, etc. Utilizing the association connection data, the owner node 304 is able to reject requests from clients 302 with stale memory states. This ensures that a client 302 only creates one valid session before it is forced to refresh its memory state. In some examples, a client object is created by the client 302 and associated with the valid session. Thus, each valid session is associated only with a single client object, created by the client 302, and a new client object must be created by the client 302 in order to initiate a new client session.

As a further example, a single node 111, and consequently its associated client 302, goes offline and returns sometime later. For example, assume that a node 111 reboots and returns after five minutes. In this case, the client 302 associated with the rebooted node 111 has a memory state that is not up-to-date. Before the client 302 associated with the rebooted node 111 is permitted to establish a session with the owner node 304, the client 302 must update its memory state.

However, some examples do not operate on whether the client 302 has a refreshed state. In such examples, the client 302 specifies an "Exclusive" flag at open time, and the server accepts the first incoming client while rejecting all other client sessions.

In other examples, the association connection data identifies that the client 302 intends to connect in exclusive or non-exclusive mode (the connection mode), and whether the client 302 has a refreshed memory state. This enables the owner node 304 to reject requests for exclusive session modes if the owner node 304 is already operating non-exclusively, guaranteeing that exclusive, non-overlapping sessions remain exclusive and do not overlap.

At 506 the owner node 304 receives I/O requests from the session client 302. The I/O requests are transmitted, in some examples, from users, VMs, etc. by way of the session client 302. In some examples, the session client 302 only accepts I/O requests from sources which are operating on the same host computing device 800 (illustrated in FIG. 8) as the session client 302 in order to reduce latency, improve connectivity, and ensure ample bandwidth is available for communication between the hosts 800. The owner node 304 performs the received I/O requests upon the vSAN 115 and its underlying storage 306 at 508.

If the session continues, or is not terminated at 510, then the owner node 304 continues to receive I/O requests from the session client 302 and perform them. However, in some examples, the session is terminated at 510. For example, the session is terminated if the owner node 304 experiences a failover, if there is a loss of liveness in the session client 302 or the owner node 304, or if there is any other break in the continuity of the session. In some examples, the liveness of the owner node 304 is monitored by an API (e.g., DOMOwner_SetLivenesState).

In some examples, the owner node 304 detects that the client 302 has lost liveness through use of a mechanism such as a heart-beat. Specifically, the underlying network layer (in the example of vSAN this is reliable datagram transport (RDT) which is a thin wrapper on top of the transmission control protocol (TCP)) has some mechanism (e.g., heart-beat) to detect a broken connection even if the client 304 did not close the network connection before it died. For example, if a heart-beat mechanism is used, the owner node 304 can detect that the client 302 died after the owner node 304 notices that no heart-beat was received. This allows the owner node 304 to quickly detect that the client 302 is down and thus the owner node 304 is free to accept connections from new clients 302. Another mechanism for detecting loss of liveness is if the owner node 304 receives another client 302 connection request, the owner node 304 proactively pings the current exclusive client 302 to see whether it is still live. This allows even faster client-failure detection.

If a session is terminated due to loss of liveness by the owner node 304, the owner closes the client association by an API (e.g., DOMOwnerRegainedLiveness). In some example where ownership is transferred from one node to another node, the client 302 is prevented from reconnecting before refreshing its memory state by an API (e.g., DOMCommon_ResolverCallback).

If the session is terminated at 510, then any pending I/O requests, in-flight I/O requests, I/O requests which were not yet transmitted by the session client 302, I/O requests which were only partially performed, or I/O requests, which were otherwise not completed by the owner node 304, are failed at 512. The terminated client 302 (i.e., a session client 302 which was terminated) is notified that the I/O requests failed, and the terminated client 302 must ignore any cached in-memory state relating to the failed I/O requests or writes. In some examples, an error is returned to the client 302 by the owner node 304 to indicate that the I/O requests have failed. Once the session is terminated, the owner node 304 is able to accept a request from another client 302 to begin a second, non-overlapping, exclusive session at 504.

Figure 6:
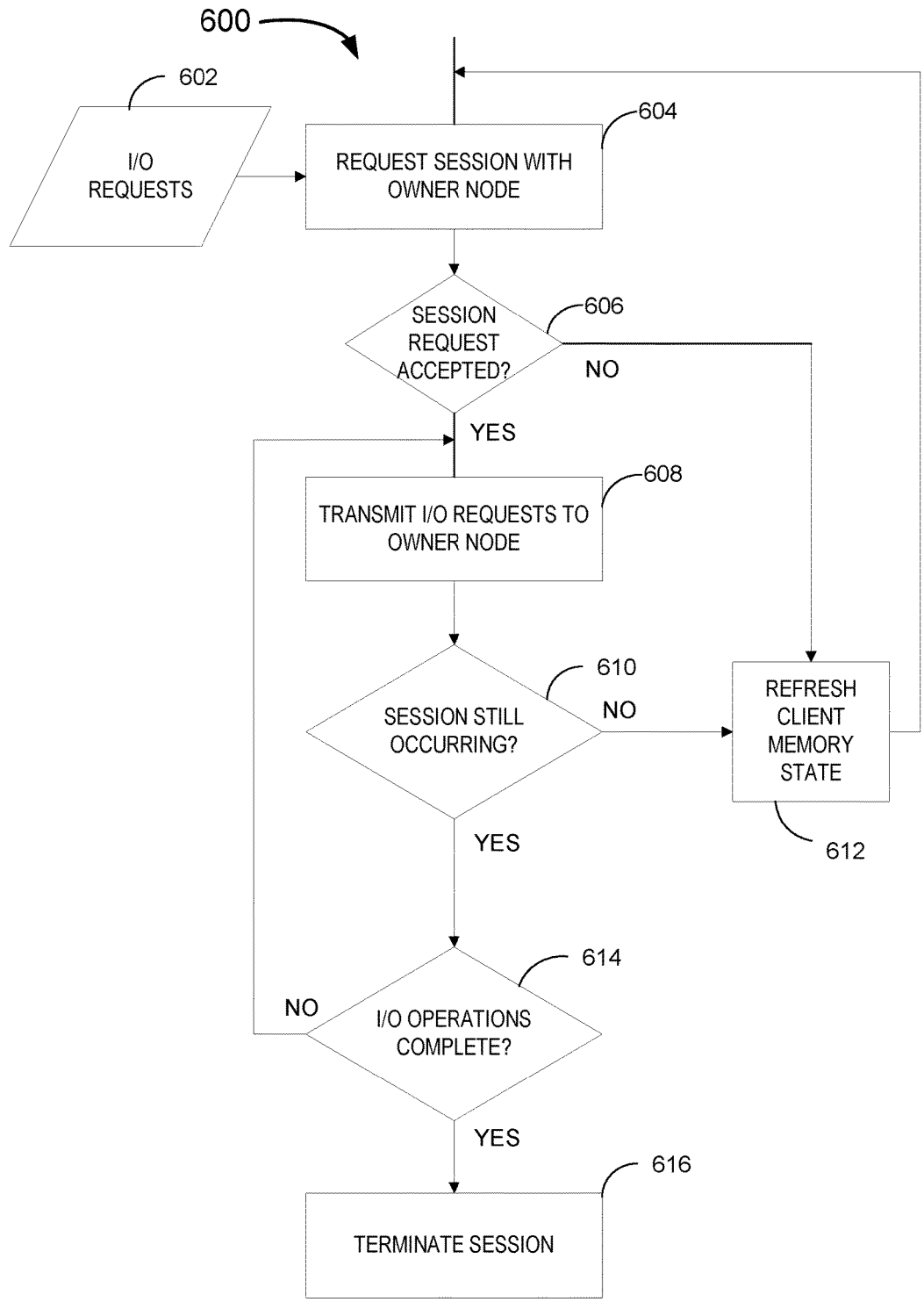
FIG. 6 is a flowchart of an exemplary method of executing non-overlapping, exclusive sessions between multiple clients and a single owner node, as performed by the client.

FIG. 6 is a flowchart of an exemplary method of executing non-overlapping, exclusive sessions between multiple clients and a single owner node, as performed by the client. Under method 600, the client 302 receives I/O requests at 602. In some examples, the I/O requests originate with VMs 112. However, the I/O requests may originate from any source, such as input devices, mobile devices, desktop computers, etc. At 604, the client 302 requests, attempts, or asks to initiate a session with the owner node 304. Whichever client is first to successfully connect to the owner node 304 is the successful client 302. If the session request is accepted at 606, then the successful client 302 (e.g., the session client 302) begins transmitting its I/O requests to the owner node 304 at 608. If the client 302 is not successful in initiating a session, then the client continues to attempt to initiate the session at 604.

At 610, if the session is still occurring, running, or otherwise has not been terminated, then the session client 302 continues to transmit its I/O requests at 608 until there are no remaining, un-performed I/O requests at 614. Once all I/O requests have been successfully performed, the session terminates at 616. However, if the session fails at 610 before all the remaining I/O requests are performed, then the session client 302—now the terminated client 302—abdicates its pending the I/O requests, or it must reconnect to the owner node 304 and retry its transaction from the beginning.

Additionally, the terminated client 302, in some examples, is flagged using association connection data to transmit a flag status passed back from the owner node 304 to the terminated client 302, as described above. A flagged client 302 is not considered valid, and it must refresh its memory state before it is permitted to initiate another session. In some examples, the client 302 refreshes its memory state of clears flags using an API (e.g. DOMClientAbortResetProcessRequest). In this manner, each session is treated as unique and non-replicable. In some examples, in order to ensure the uniqueness of each session, the association connection data passed between the client 302 and the owner node 304 includes a client session ID. The client session ID is assigned to the client 302 by the owner node 304, or generated by the client and supplied to the owner node 304. The client session ID identifies the specific instantiation of a session between the client 302 and the owner node 304, in some examples it is an ID based on the unique identifier (UID) or the universal unique identifier (UUID) of the client 302 and the host 800 of the client 302, or another client-specific, unique identifier.

In some examples, the I/O requests of a client 302 are a discrete set of interrelated I/O requests, and the set of I/O requests must either all be completed, or all fail. In other examples, the I/O requests are treated separately, and some I/O requests are successfully completed, while others fail without effecting the completed I/O requests. Upon refreshing its memory state at 612, the terminated client 302 is free to attempt to establish a new session with the owner node 304, at 604.

Figure 7:
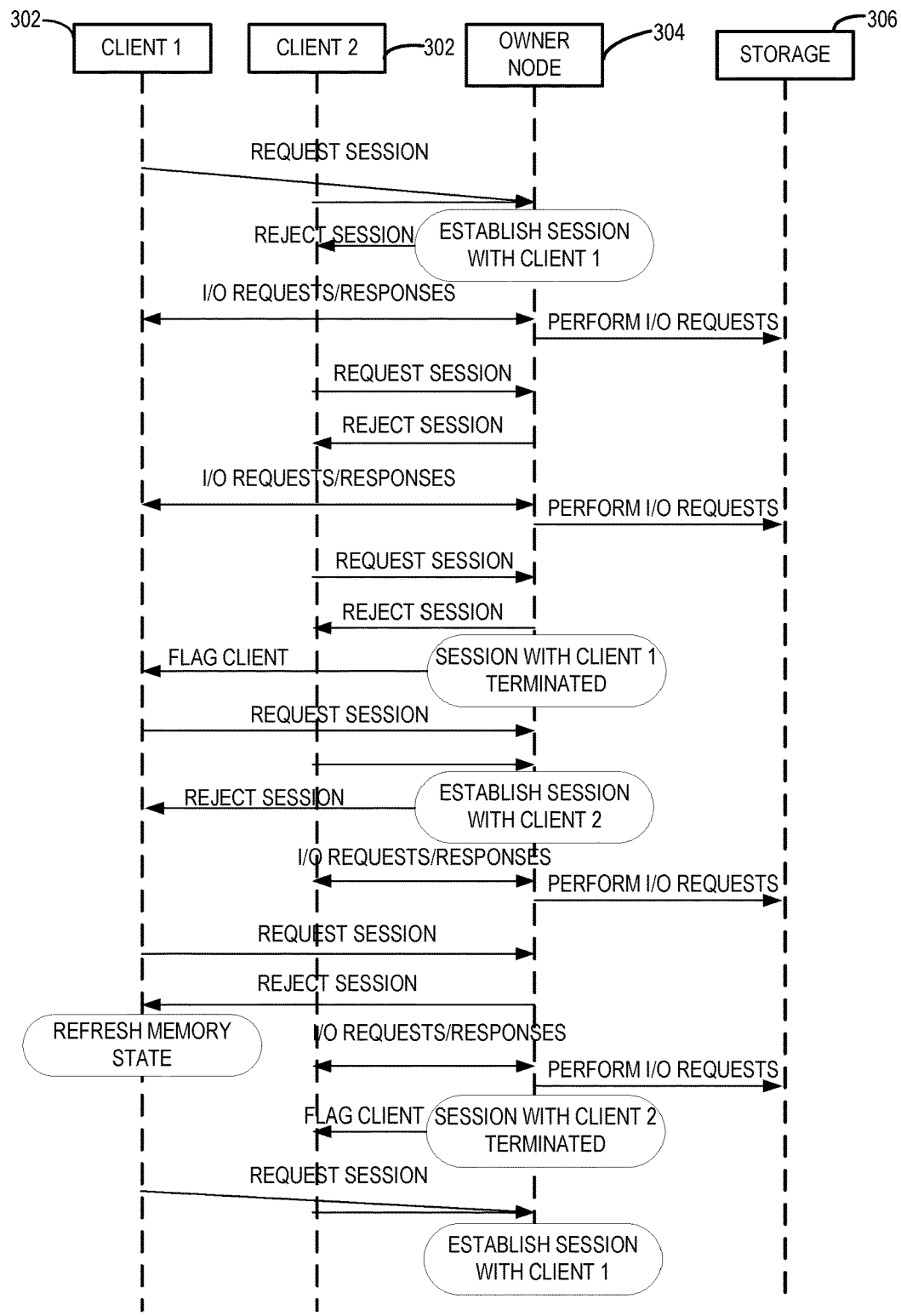
FIG. 7 is a sequence diagram illustrating the interactions between two clients, the owner node, and the underlying storage during the execution of non-overlapping, exclusive sessions.

FIG. 7 is a sequence diagram illustrating the interactions between two clients 302, the owner node 304, and the underlying storage 306 during the execution of non-overlapping, exclusive sessions. In the example of FIG. 7, both client 1 302 and client 2 302 request sessions with the owner node 304. Although at this time both client 1 302 and client 2 302 are valid and able to connect, both are requesting exclusive, non-overlapping sessions with the owner node 304. Consequently, the owner node 304 only establishes one session with client 1 304. In this example, the owner node 304 receives both requests simultaneously, and selects one at random. In other examples, the owner node 304 selects the first request from a valid client 302 which it receives. In other examples, described above in the description of FIG. 5, a policy federated by an administrator, for example, is utilized to select which valid client 302 is initially chosen from a plurality of clients 302.

The session client 1 302 transmits its I/O requests to the owner node 304, which relays responses, if appropriate. The owner node 304 performs the I/O requests on the underlying storage 306. Meanwhile, client 2 302 is still attempting to connect with the owner node 302 by requesting a session. The owner node 304 continually rejects requests from clients 302 during the session with the session client 1 302. While client 2 302 is requesting a session, I/O requests are transmitted and performed, as necessary. The session with client 1 302 is terminated, at some point. The termination of the session is, in some examples, because the I/O requests are all completed or the session is closed normally; in other examples, the session is terminated because of a failover by the owner node 304, a connectivity problem such as either the client 302 or the owner node 304 disconnecting, the connection failing independently, the node 111 becoming unhealthy, a loss of liveness, etc. Upon termination of the session, in some examples the now terminated client 1 304 is flagged, as described above in more detail in FIG. 6.

In some examples, once the first client session terminates, the owner node 304 advertises that it is free to accept new client sessions. In one example, a callback is issued by the owner node 304 (e.g., DOMServerHandleMultipleAssocCb). In other examples, potential clients 302 with pending I/O requests continue to request client sessions until the pending I/O requests are resolved.

Both client 1 302 and client 2 302 then requests subsequent, non-overlapping, exclusive sessions with the owner node 304. In the illustrated example, the request is received first from client 1 302. However, the owner node 304 accepts the request from client 2 302. The request from client 2 304 is accepted because client 2 302 is still valid. However, client 1 302 was flagged upon termination with the owner node 304, and has not yet refreshed its memory state in order to clear the flag. Consequently, client 1 304 is not a valid client 302, and must clear its flag by refreshing its memory state before reconnect to the owner node 304.

Upon establishing the next session with client 2 302, the owner node 304 and the session client 2 302 engage in the same process of passing I/O requests and performing the I/O requests, as described above. Again, the owner node 304 rejects any requests for a session from client 1 302, because the session with session client 2 302 is exclusive and non-overlapping and because client 1 302 is invalid due to its flag. While session client 2 302 is passing its I/O requests, client 1 302 refreshes its memory state, thus clearing the flag and making client 1 302 a valid client 302 for a session with the owner node 304. Alternatively, refreshing the memory state involves the client 302 acknowledging the connection is lost, and starting a process to reconnect and refresh its memory state. Alternatively, the client 302 invalidates its memory state, but does not necessarily discard it, depending on what it reads from disk. In some examples, the client 302 finds that no other client 302 made changes and it can maintain some memory state.

Once the session with client 2 302 is terminated, client 2 302 is flagged. Both clients again request an exclusive, non-overlapping session with owner node 304. Although both requests are received simultaneously, only client 1 302 is valid, because client 2 302 is flagged. Consequently, the owner node 304 establishes a new, non-overlapping, exclusive session with client 1 302.

Figure 8:
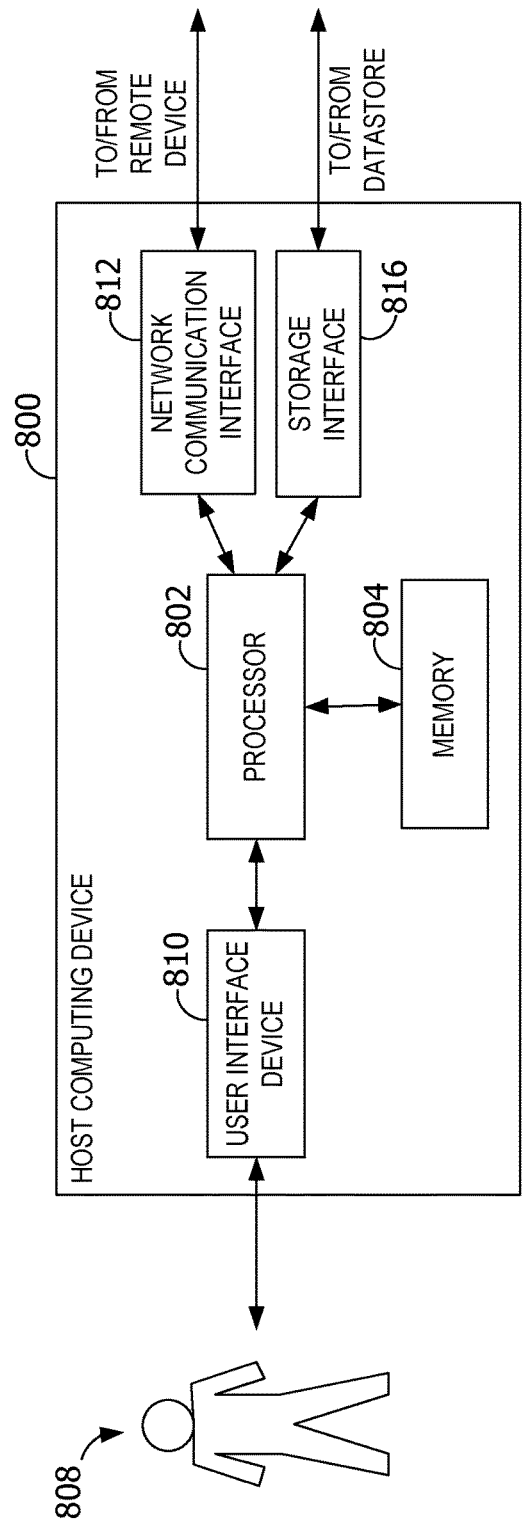
FIG. 8 is a block diagram of an exemplary host computing device, upon which the disclosed system operates.

FIG. 8 is a block diagram of an example host computing device 800. Host computing device 800 includes a processor 802 for executing instructions. In some examples, executable instructions are stored in a memory 804. Memory 804 is any device allowing information, such as executable instructions and/or other data, to be stored and retrieved. For example, memory 804 may include one or more random access memory (RAM) modules, flash memory modules, hard disks, solid state disks, and/or optical disks.

Host computing device 800 may include a user interface device 810 for receiving data from a user 808 and/or for presenting data to user 808. User 808 may interact indirectly with host computing device 800 via another computing device such as a device running VMware's vCenter Server or other management device. User interface device 810 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 810 operates to receive data from user 808, while another device (e.g., a presentation device) operates to present data to user 808. In other examples, user interface device 810 has a single component, such as a touch screen, that functions to both output data to user 808 and receive data from user 808. In such examples, user interface device 810 operates as a presentation device for presenting information to user 808. In such examples, user interface device 810 represents any component capable of conveying information to user 808. For example, user interface device 810 may include, without limitation, a display device (e.g., a liquid crystal display (LCD), organic light emitting diode (OLED) display, or "electronic ink" display) and/or an audio output device (e.g., a speaker or headphones). In some examples, user interface device 810 includes an output adapter, such as a video adapter and/or an audio adapter. An output adapter is operatively coupled to processor 802 and configured to be operatively coupled to an output device, such as a display device or an audio output device.

Host computing device 800 also includes a network communication interface 812, which enables host computing device 800 to communicate with a remote device (e.g., another computing device) via a communication medium, such as a wired or wireless packet network. For example, host computing device 800 may transmit and/or receive data via network communication interface 812. User interface device 810 and/or network communication interface 812 may be referred to collectively as an input interface and may be configured to receive information from user 808.

Host computing device 800 further includes a storage interface 816 that enables host computing device 800 to communicate with one or more data storage devices, which store virtual disk images, software applications, and/or any other data suitable for use with the methods described herein. In example examples, storage interface 816 couples host computing device 800 to a storage area network (SAN) (e.g., a Fibre Channel network) and/or to a network-attached storage (NAS) system (e.g., via a packet network). The storage interface 816 may be integrated with network communication interface 812.

Figure 9:
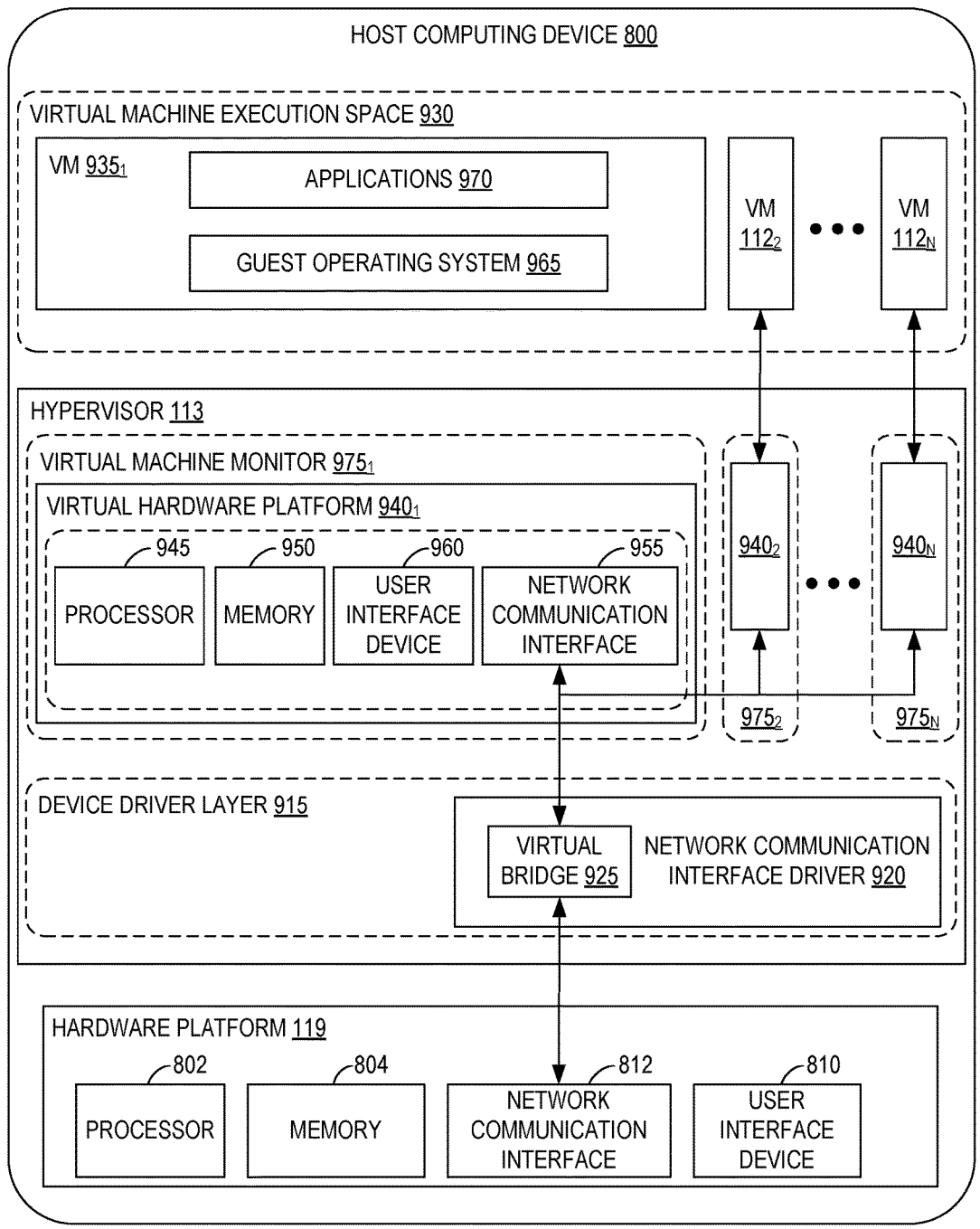
FIG. 9 is a block diagram of virtual machines that are instantiated on a computing device, such as the host computing device shown in FIG. 8.

FIG. 9 depicts a block diagram of virtual machines $112_1$, $112_2 \ldots 112_N$ that are instantiated on host computing device 800. Host computing device 800 includes a hardware platform 119, such as an x86 architecture platform. Hardware platform 119 may include processor 802, memory 804, network communication interface 812, user interface device 810, and other input/output (I/O) devices, such as a presentation device 806 (shown in FIG. 8). A virtualization software layer, also referred to hereinafter as a hypervisor 113, is installed on top of hardware platform 119.

The virtualization software layer supports a virtual machine execution space 930 within which multiple virtual machines (VMs $112_1$-$112_N$) may be concurrently instantiated and executed. Hypervisor 113 includes a device driver layer 915, and maps physical resources of hardware platform 119 (e.g., processor 802, memory 804, network communication interface 812, and/or user interface device 810) to "virtual" resources of each of VMs $112_1$-$112_N$ such that each of VMs $112_1$-$112_N$ has its own virtual hardware platform (e.g., a corresponding one of virtual hardware platforms $940_1$-$940_N$), each virtual hardware platform having its own emulated hardware (such as a processor 945, a memory 950, a network communication interface 955, a user interface device 960 and other emulated I/O devices in VM $112_1$). Hypervisor 113 manages (e.g., monitor, initiate, and/or terminate) execution of VMs $112_1$-$112_N$ according to policies associated with hypervisor 113, such as a policy specifying that VMs $112_1$-$112_N$ are to be automatically restarted upon unexpected termination and/or upon initialization of hypervisor 113. In addition, or alternatively, hypervisor 113 manages execution VMs $112_1$-$112_N$ based on requests received from a device other than host computing device 800. For example, hypervisor 113 may receive an execution instruction specifying the initiation of execution of first VM $112_1$ from a management device via network communication interface 812 and execute the execution instruction to initiate execution of first VM $112_1$.

In some examples, memory 950 in first virtual hardware platform $940_1$ includes a virtual disk that is associated with or "mapped to" one or more virtual disk images stored on a disk (e.g., a hard disk or solid state disk) of host computing device 800. The virtual disk image represents a file system (e.g., a hierarchy of directories and files) used by first VM $112_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 915 includes, for example, a communication interface driver 920 that interacts with network communication interface 812 to receive and transmit data from, for example, a local area network (LAN) connected to host computing device 800. Communication interface driver 920 also includes a virtual bridge 925 that simulates the broadcasting of data packets in a physical network received from one communication interface (e.g., network communication interface 812) to other communication interfaces (e.g., the virtual communication interfaces of VMs $112_1$-$112_N$). Each virtual communication interface for each VM $112_1$-$112_N$, such as network communication interface 955 for first VM $112_1$, may be assigned a unique virtual Media Access Control (MAC) address that enables virtual bridge 925 to simulate the forwarding of incoming data packets from network communication interface 812. In an example, network communication interface 812 is an Ethernet adapter that is configured in "promiscuous mode" such that all Ethernet packets that it receives (rather than just Ethernet packets addressed to its own physical MAC address) are passed to virtual bridge 925, which, in turn, is able to further forward the Ethernet packets to VMs $112_1$-$112_N$. This configuration enables an Ethernet packet that has a virtual MAC address as its destination address to properly reach the VM in host computing device 800 with a virtual communication interface that corresponds to such virtual MAC address.

Virtual hardware platform $940_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 965 in order to execute applications 970 for an instantiated VM, such as first VM $112_1$. Virtual hardware platforms $940_1$-$940_N$ may be considered to be part of virtual machine monitors (VMM) $975_1$-$975_N$ that implement virtual system support to coordinate operations between hypervisor 113 and corresponding VMs $112_1$-$112_N$. Those with ordinary skill in the art will recognize that the various terms, layers, and categorizations used to describe the virtualization components in FIG. 9 may be referred to differently without departing from their functionality or the spirit or scope of the disclosure. For example, virtual hardware platforms $940_1$-$940_N$ may also be considered to be separate from VMMs $975_1$-$975_N$, and VMMs $975_1$-$975_N$ may be considered to be separate from hypervisor 113. One example of hypervisor 113 that may be used in an example of the disclosure is included as a component in VMware's ESX/ESXi brand software, which is commercially available from VMware, Inc.

ADDITIONAL EXAMPLES

The operations described herein are, in some examples, performed in a DOM environment. The I/O requests performed include those which may be issued through virtual distributed file systems (VDFS), internet small computer system interface (iSCSI), etc. In some examples, the described method ensures the integrity of I/O requests when a network partition exists. In that example, each partition has a separate owner, and each client 302 (e.g., each iSCSI client) connects and sends commands to its respective owner node 304 on its own side of the partition. Previously, this could cause conflicting I/Os, because the minority partition client 302 could connect while the majority partition client 302 is connecting and sending its I/O requests. Then the minority partition client 302 would automatically send its I/O requests, without refreshing its state. This eventually leads to a data corruption problem. However, in the system described herein, the minority partition client 302 is prohibited from connecting to the owner node 304 until it refreshes its memory state, preventing data corruption problems.

In the scenario where an owner node 304 loses liveness and comes back, the client 302 by default stays connected. In that example, the owner node 304 needs to sever the client session explicitly. In this scenario, if the owner node 304 regains liveness before all paths are down (e.g., the object, owner node 304 or network dies), the owner node 304 severs the client session, which aborts the I/O requests. In some examples, this results in the client 302 returning an error code (e.g., VMK_LOCK_LOST).

In other examples, if the owner node 304 regains liveness after APD, the owner node 304 severs the client session by default. In that example, the owner node 304 returns all pending I/O requests with an error (e.g. VMK_NO_CONNECT), which the client 302 returns. The owner node 304 also abdicates or loses its ownership position, if it determines it is stale (i.e., that its memory state is not refreshed or is out of date). In some examples, regardless of the cause, if the client session is terminated, fails, etc., all in-flight I/O requests are aborted, and an error is returned to the client 302.

In the example where the owner node 304 determines that its memory state is stale after regaining liveness, it abdicates and publishes a NULL owner entry, indicating that the objects are owned by a NULL UUID (the universally unique identifier (UUID) of the stale owner node 304). Any connected client 302, if not already terminated by the owner node 304, terminates its client session. Another node becomes the owner node 304 and begins accepting session requests with clients 302 with refreshed memory states.

In some examples, the disclosed operations are performed by executing instructions stored on a non-transitory computer-readable medium. The instructions are, in some examples, executed by the owner node 304, the host 800, the hypervisor 113, or any other disclosed structure capable of executing the instructions.

Exemplary Operating Environment

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some embodiments, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. In some embodiments, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, embodiments of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The embodiments illustrated and described herein as well as embodiments not specifically described herein but within the scope of aspects of the disclosure constitute exemplary means for effectuating multiple I/O requests from multiple sources, without a heavy locking system. Any system wherein an exclusive relationship between a source of I/O requests and the executor of I/O requests exists is contemplated. In such a system, I/O requests are blocked if they are transmitted or received outside the exclusive relationship, or if the executor loses its control over the storage system.

At least a portion of the functionality of the various elements illustrated in the figures may be performed by other elements in the figures, or an entity (e.g., processor, web service, server, application program, computing device, etc.) not shown in the figures.

In some embodiments, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A computing system for managing a plurality of non-overlapping, sessions between clients and an owner node, comprising:
   a memory; and
   instructions stored in the memory and executed by a processor for issuing, by the client, input/output (I/O) requests to a virtual storage area network (vSAN) and performing, by the owner node the I/O requests on the vSAN by:
      requesting, by a plurality of the clients, a first session with the owner node, the owner node controlling access to the vSAN;
      transmitting, by a first client of the plurality of the clients during the first session, a plurality of the I/O requests to the owner node; and
      upon termination of the first session, requesting, by any of the clients, a second session with the owner node, wherein the first session and the second session are non-overlapping;
      establishing, by the owner node, in response to a request for the first session, the first session with the first client;
      rejecting, by the owner node, all other requests for sessions from the plurality of the clients for a duration of the first session;
      performing, by the owner node, the I/O requests transmitted by the first client;
      and
      upon termination of the first session:
         failing, by the owner node, any outstanding I/O requests transmitted by the first client; and
         establishing, by the owner node, the second session after termination of the first session with the first client, thereby establishing non-overlapping sessions to guarantee a validity of transmitted I/O requests.

2. The computing system of claim 1, wherein only one non-overlapping session is established between any of the plurality of the clients and the owner node at a time.

3. The computing system of claim 1, wherein the owner node is any one of a plurality of nodes which has obtained control over a majority of a plurality of objects on the vSAN.

4. The computing system of claim 1, wherein the owner node establishes a new session with the first client upon the first client refreshing its memory state.

5. The computing system of claim 1, wherein the first client receives the I/O requests from a plurality of virtual machines (VMs).

6. The computing system of claim 1, wherein requesting, by the plurality of the clients, the first session with the owner node further comprises:
   creating, by each of the clients, a client object with one valid session association;
   continuing to request the first session until the first session is established;
   associating the first session with the client object; and
   terminating the client object upon termination of the first session associated with the client object.

7. The computing system of claim 1, wherein requesting, by the plurality of the clients, the first session with the owner node further comprises each of the plurality of the clients continuing to request the first session until the first session is established.

8. A method for managing a plurality of non-overlapping sessions between clients and an owner node, the method comprising:
  executing, by the clients, input/output (I/O) requests to a virtual storage area network (vSAN) and performing, by the owner node, the I/O requests on the vSAN by:
  requesting, by a plurality of the clients, a first session with the owner node, the owner node controlling access to the vSAN;
  transmitting, by a first client of the plurality of the clients during the first session, a plurality of the I/O requests to the owner node;
  upon termination of the first session, requesting, by any of the clients, a second session with the owner node, wherein the first session and the second session are non-overlapping;
  establishing, by the owner node, in response to a request for the first session, the first session with the first client;
  rejecting, by the owner node, all other requests for sessions from the plurality of the clients for a duration of the first session;
  performing, by the owner node, the I/O requests transmitted by the first client; and
  upon termination of the first session:
    failing, by the owner node, any outstanding I/O requests of the first client; and
    establishing, by the owner node, the second session after termination of the first session with the first client, thereby establishing non-overlapping sessions to guarantee the validity of transmitted I/O requests.

9. The method of claim 8, wherein only one non-overlapping session is established between any of the plurality of the clients and the owner node at a time.

10. The method of claim 8, wherein the owner node is any one of a plurality of nodes which has obtained control over a majority of a plurality of objects on the vSAN.

11. The method of claim 8, wherein the owner node establishes a new session with the first client upon the first client refreshing its memory state.

12. The method of claim 8, wherein the first client receives the I/O requests from a plurality of virtual machines (VMs).

13. The method of claim 8, wherein requesting, by the plurality of the clients, the first session with the owner node further comprises:
  creating, by each of the clients, a client object with one valid session association;
  continuing to request the first session until the first session is established;
  associating the first session with the client object; and
  terminating the client object upon termination of the first session associated with the client object.

14. The method of claim 8, wherein requesting, by the plurality of the clients, the first session with the owner node further comprises each of the plurality of the clients continuing to request the first session until the first session is established.

15. The method of claim 8, wherein failing any outstanding I/O requests transmitted by the first client further comprises aborting any retries of the I/O requests in flight and returning an error to the first client.

16. A non-transitory computer-readable medium including instructions, when executed by a processor, perform a method of managing a plurality of non-overlapping sessions between clients and the owner node, the method comprising
  issuing, by the clients, input/output (I/O) requests to a virtual storage area network (vSAN) and performing, by the owner node, the I/O requests on the vSAN by:
  requesting, by a plurality of the clients, a first session with the owner node, the owner node controlling access to the vSAN;
  transmitting, by a first client of the plurality of the clients during the first session, a plurality of the I/O requests to the owner node;
  upon termination of the first session, requesting, by any of the clients, a second session with the owner node, wherein the first session and the second session are non-overlapping;
  establishing, by the owner node, in response to a request for the first session, the first session with the first client;
  rejecting, by the owner node, all other requests for sessions from the plurality of the clients for a duration of the first session;
  performing, by the owner node, the I/O requests transmitted by the first client; and
  upon termination of the first session:
    failing, by the owner node, any outstanding I/O requests from the first client; and
    establishing, by the owner node, the second non-overlapping session with a second client after termination of the first session with the first client, thereby establishing non-overlapping sessions to guarantee a validity of transmitted I/O requests.

17. The non-transitory computer-readable medium of claim 16, wherein only one exclusive, non-overlapping session is established between any of the plurality of the clients and the owner node at a time.

18. The non-transitory computer-readable medium of claim 16, wherein the owner node is any one of a plurality of nodes which has obtained control over a majority of a plurality of objects on the vSAN.

19. The non-transitory computer-readable medium of claim 18, wherein the owner node establishes a new session with the first client upon the first client refreshing its memory state.

20. The non-transitory computer-readable medium of claim 18, wherein the first client receives the I/O requests from a plurality of virtual machines (VMs).

* * * * *